Patented Mar. 16, 1926.

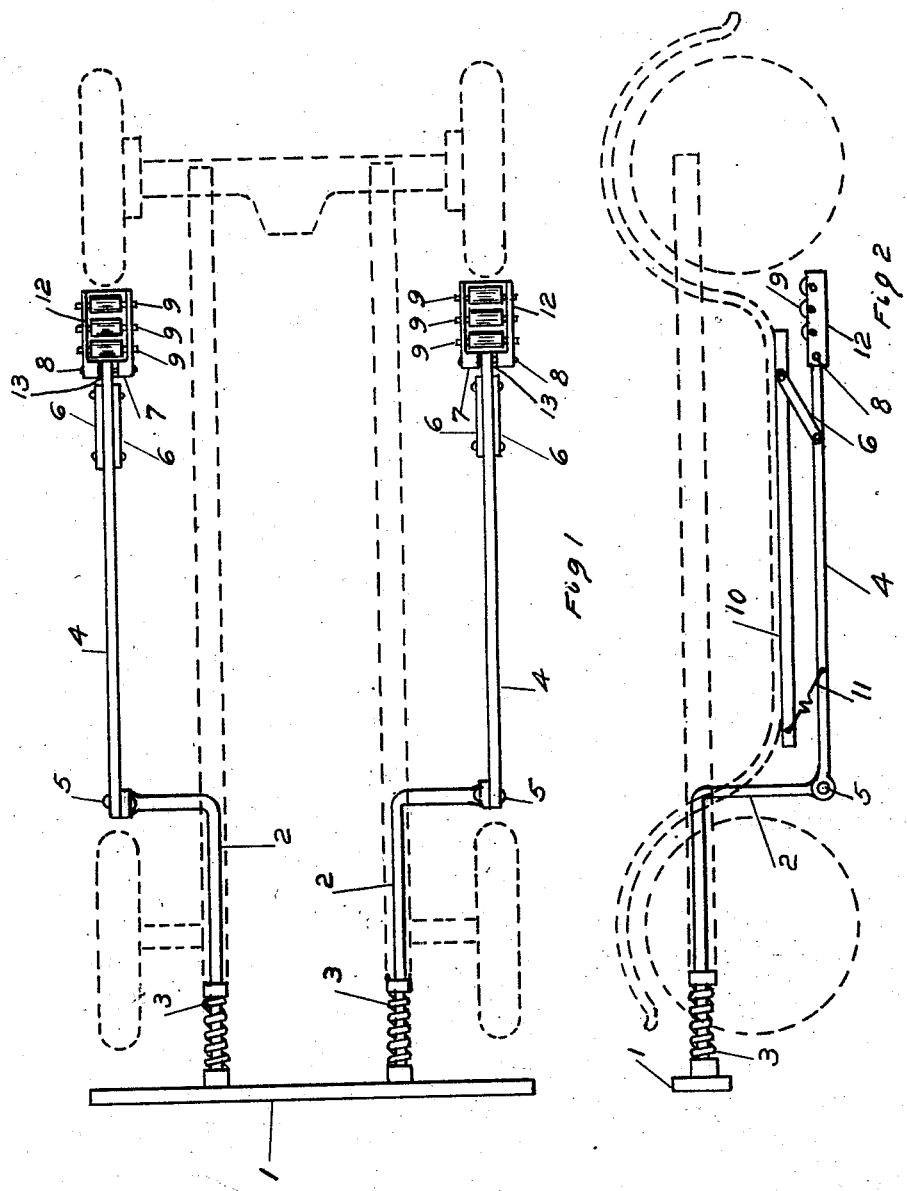

1,577,198

UNITED STATES PATENT OFFICE.

JOSEPH SIEGEL, OF PITTSFIELD, MASSACHUSETTS.

AUTOMATIC STOP.

Application filed July 30, 1925. Serial No. 47,151.

*To all whom it may concern:*

Be it known that I, JOSEPH SIEGEL, a citizen of the United States, residing at Pittsfield, in the county of Berkshire and State of Massachusetts, have invented certain new and useful Improvements in Automatic Stops, of which the following is a specification.

This invention relates to automatic stops for motor vehicles and particularly to devices for stopping such vehicles. The object of the invention is to provide means by which the bumper on a power propelled vehicle will operate a set of rollers when the said fender strikes an obstacle in a manner to apply the rollers thereby bringing the vehicle to a state of rest.

A further object of the invention is to so construct the automatic stop device that the vehicle may be stopped without placing a sudden strain on the motor.

A further object is to provide simple and efficient means for normally holding the rollers in raised or inoperative position, this means also being adapted to facilitate return of the rollers to inoperative position after the vehicle has been stopped.

With the foregoing and other objects in view as will hereinafter appear from time to time, this invention consists in the peculiar combination and arrangement of the various related elements set forth and more particularly described in the appended claims.

In the drawings:

Figure 1 is a plan view of an automobile chassis and wheels shown in dotted lines with the automatic stop device attached thereto.

Figure 2 is an elevation of the automobile chassis, wheels, mudguards and running board shown in dotted lines with my automatic stop device attached thereto.

As illustrated in the accompanying drawings, 1 is a bumper to which is attached two extension bumper bars 2, and these bars are pivotally attached to the side rods 4 by means of the pins 5 and the side rods are free to rotate about the pins 5.

A roller receptacle 12 is pivotally connected to the side rod 4 by means of a pin 8. This means of connection between the roller receptacle and the side rod 4 provides means whereby the roller receptacle may rotate in an upward position irrespective of the angle of incline of the rod 4. The roller receptacle proper contains a plurality of rollers 9, and these rollers are secured to the roller receptacle and are free to rotate therein. It will be seen by referring to the drawings that I have provided the roller receptacle with a slot 13 for the insertion of the side rod 4. This slot being open at the top of the roller receptacle will hold the roller receptacle in a horizontal position, and at the same time provide means whereby the roller receptacle may operate in a horizontal plane.

A clamping bar 10 is fastened to the running board of the automobile, by means of bolts or other means, and extending therefrom are connecting rods 6 which rods are connected to the clamping bar 10 and the side rod 4. A spring 11 is also connected to the clamping bar 10 and the side rod 4. This spring provides the means whereby the roller receptacle 12 is brought to a raised or inoperative position.

The operation of the device is as follows:

A force applied to the bumper and towards the vehicle is transmitted longitudinally along the extension bumper bars 2. This motion causes the side rods 4 to move in an inclined position towards the rear wheels of the vehicle. The roller receptacles 12 are forced under the rear wheels of the vehicle, and the rollers 9, which project above the roller receptacles, come in contact with and under the rear wheels thereby causing the rear wheels to spin around on the rollers and causing the vehicle to stop. When the motor of the vehicle is shut off the springs 11, aided by the fender springs 3, will cause the roller receptacles to return to a raised or inoperative position when the motor is operated in a reverse direction.

The vehicle is returned to the road surface by pushing the vehicle off the roller bearings.

Having thus described my invention, what I claim as new and desire to secure by Letters Patent is:

1. In a device of the class described the combination with a bumper bar, an extension bumper bar, a side rod pivotally connected to said extension bumper bar, a roller receptacle pivotally connected to said side rod, a plurality of rollers within said roller receptacle, a clamping bar, connecting rods connected to said clamping bar and the side rod, a spring connected to the clamping bar and the side rod, said spring to facilitate return of the roller receptacle to a raised or inoperative position.

2. In a device of the class described the combination with a bumper bar, an extension bumper bar, a side rod pivotally connected to said extension bumper bar, a roller receptacle pivotally connected to said side rod so as to operate in a horizontal plane, and said roller receptacle provided with a slot at connection with the side rod, a plurality of rollers within said roller receptacle, a clamping bar, connecting rods connected to said clamping bar and the side rod and so connected to cause the side rod to operate in an inclined position, a spring connected to the clamping bar and the side rod, said spring to facilitate return of the roller receptacle to a raised or inoperative position.

In testimony whereof I affix my signature.

JOSEPH SIEGEL.